United States Patent

Terada

Patent Number: 5,159,025
Date of Patent: Oct. 27, 1992

[54] STYRENE-BASED COPOLYMER AND PROCESS FOR PRODUCTION THEREOF

[75] Inventor: Eiichi Terada, Ichihara, Japan

[73] Assignee: Idemitsu Petrochemical Co., Ltd., Tokyo, Japan

[21] Appl. No.: 364,451

[22] Filed: Jun. 12, 1989

[30] Foreign Application Priority Data

Jun. 16, 1988 [JP] Japan .................. 63-146811

[51] Int. Cl.$^5$ .............................................. C08F 20/08
[52] U.S. Cl. ................................... 525/327.6; 525/282
[58] Field of Search ........................... 525/327.6, 382

[56] References Cited

U.S. PATENT DOCUMENTS

| | | | |
|---|---|---|---|
| 3,432,479 | 3/1969 | Verdol et al. | 260/78.5 |
| 3,529,993 | 9/1970 | Cummings | 117/105.5 |
| 3,792,022 | 2/1974 | Jones | 260/77.5 AM |
| 4,889,896 | 12/1989 | Canova et al. | 525/327.6 |

OTHER PUBLICATIONS

Chemical Abstracts, vol. 82, No. 11, Jun. 2, 1975, p. 92, No. 141706q, Columbus, Ohio, US; & JP-A-74 99 630, Sep. 20, 1974.

*Primary Examiner*—Joseph L. Schofer
*Assistant Examiner*—Alex H. Walker
*Attorney, Agent, or Firm*—Antonelli, Terry, Stout & Kraus

[57] ABSTRACT

A styrene-based copolymer comprising 74.3 to 98.7 mol % of the structural unit (I) represented by the general formula:

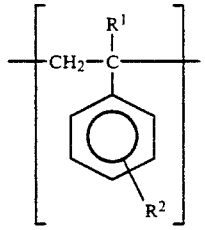

1.3 to 25.4 mol % of the structural unit (II) represented by the formula:

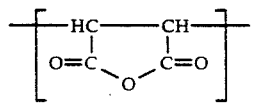

and 10 to 7000 mol ppm of the structural unit (III) represented by the general formula:

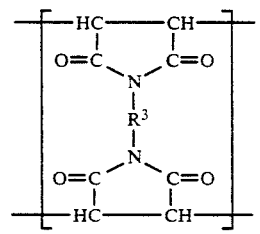

(wherein $R^1$ to $R^3$ are as defined in the appended claims), characterized by having toluene-insoluble content of not more than 0.5% by weight, is disclosed.

Efficient processes for producing the above styrene-based copolymer are also disclosed.

5 Claims, No Drawings

STYRENE-BASED COPOLYMER AND PROCESS FOR PRODUCTION THEREOF

BACKGROUND OF THE INVENTION

1. Field of the Invention

The present invention relates to a styrene-based copolymer and a process for production thereof, more particularly a copolymer of styrene and maleic anhydride excellent in impact resistance, heat resistance and transparency, being preferable as the material for various industrial goods or household electric appliances, and a process for an efficient production of said copolymer.

2. Description of the Related Arts

Copolymer of styrene and maleic anhydride (styrene-maleic anhydride copolymer) is generally a styrene-based resin which is high in heat-distortion temperature and excellent in transparency, but has a disadvantage of being so low in impact resistance that its molding is easy to break.

In order to overcome such a disadvantage, a process to improve impact resistance by adding a reinforcing agent containing rubber and the like as the main component to styrene-maleic anhydride copolymer has been proposed (Japanese Patent Publication No. 13541/1981). Though the said process may serve in improving the impact resistance to some extent, it involves a new problem that transparency is reduced.

Another process in which polycarbonate is added to styrene-maleic anhydride copolymer is disclosed (Japanese Patent Publication No. 27133/1982). According to the said process, an excellent transparency is attained, but a large amount of polycarbonate must be added to give a sufficient impact resistance, which results in lowering of the fluidity, causing poor moldability.

Moreover, a process in which rubber is dissolved into styrene monomer and maleic anhydride is added thereto to react, is disclosed (Japanese Patent Publication No. 7849/1980). According to the said process, the impact resistance is improved, but the transparency comes to be reduced.

Furthermore, a method in which diamine is reacted with styrene-maleic anhydride copolymer to form cross-linking structure has been proposed (Japanese Patent Publication No. 39651/1981). According to said process, however, the degree of cross-linking becomes so high since the amount of diamine is very large. As the result, the fluidity comes to be lowered and the insoluble content (gel) increases, which causes the moldability lowered, while impact resistance is not so improved.

SUMMARY OF THE INVENTION

An object of the present invention is to provide a copolymer of styrene and maleic anhydride excellent in impact resistance, heat resistance and transparency.

Another object of the present invention is to provide a process for efficiently producing a copolymer as mentioned above, without lowering of its fluidity. The present invention relates to a styrene-based copolymer comprising 74.3 to 98.7 mol% of a structural unit (I) represented by the general formula:

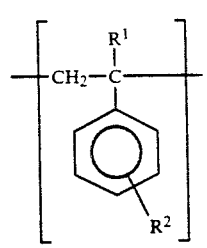

(wherein $R^1$ is a hydrogen atom or an alkyl group having 1 to 4 carbon atoms, and $R^2$ is a hydrogen atom or an alkyl group having 1 to 4 carbon atoms),
1.3 to 25.4 mol% of a structural unit (II) represented by the formula:

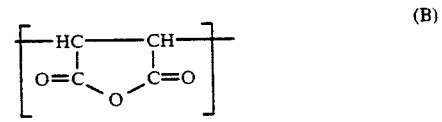

and
10 to 7000 mol ppm of a structural unit (III) represented by the general formula:

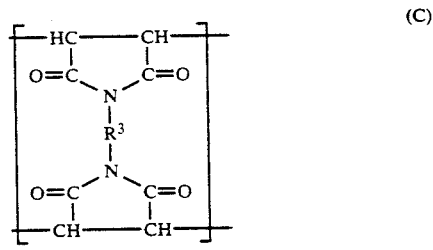

(wherein $R^3$ is a divalent organic residue), characterized by containing toluene-insoluble content of not more than 0.5% by weight.

The styrene-based copolymer of the present invention comprises, as mentioned above, 74.3 to 98.7 mol%, preferably 79.1 to 96.7 mol% of the structural unit (I) represented by the general formula (A), 1.3 to 25.4 mol%, preferably 3.3 to 20.4 mol% of the structural unit (II) represented by the formula (B) and 10 to 7000 mol ppm, preferably 30 to 5000 mol ppm of the structural unit (III) represented by the general formula (C). In the said styrene-based copolymer, when the molar fraction of the structural unit (II) is in excess of 25.4 mol%, fluidity of the copolymer is lowered, and when it is less than 1.3 mol%, heat resistance of the copolymer is unfavorably lowered. When the molar fraction of the structural unit (III) is in excess of 7000 mol ppm, impact resistance of the copolymer is not so improved, and when it is less than 10 mol ppm, impact resistance of the copolymer is not improved sufficiently.

The toluene-insoluble content in the styrene-based copolymer of the present invention is not more than 0.5% by weight, preferably not more than 0.1% by weight. If toluene-insoluble content (gel component) is in excess of 0.5% by weight, it leads to unfavorable results as lowered moldability.

The toluene-insoluble content is measured as follows.

A hundred grams of the copolymer is dissolved into 1 liter of toluene for 24 hours, centrifuged at 2400 G for ten minutes, and further the resulting gel component is dipped in 1 liter of toluene for an hour, and centrifuged again. The supernatant is poured out. Then the gel component is dried in vacuum at 25° C. for 24 hours, and weighed.

The weight average molecular weight of the styrene-based copolymer of the present invention is not critical, but usually approximately 100,000 to 3,000,000.

In the styrene-based copolymer of the present invention, the arrangement of bonding of each structural unit is not critical, but various manners are possible. Usually, alternate copolymerization, random copolymerization, block copolymerization or graft, copolymerization of the structural unit (I) and the structural unit (II) forms main structure, in which the structural unit (III) is combined in various manners.

The styrene-based copolymer of the present invention can be produced according to various processes. Preferred processes for efficient production of said copolymer are Processes I and II as follows.

Process I is a process in which the styrene-maleic anhydride copolymer comprising 75 to 98% by weight, preferably 80 to 97% by weight of the abovementioned structural unit (I) and 25 to 2% by weight, preferably 20 to 3% by weight of the structural unit (II) is reacted with the diamine represented by the general formula:

(wherein $R^3$ is as defined before).

Process II is a process in which 75 to 98% by weight, preferably 80 to 97% by weight of styrene-based monomer represented by the general formula:

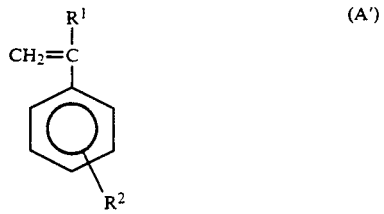

(wherein $R^1$ and $R^2$ are as defined before), 25 to 2% by weight, preferably 20 to 3% by weight of maleic anhydride and diamine represented by the general formula (D) are reacted with each other.

The styrene-maleic anhydride copolymer comprising 75 to 98% by weight of the structural unit (I) and 25 to 2% by weight of the structural unit (II) used in the above-described Process I, can be easily produced according to conventionally known methods from 75 to 98% by weight of the styrene-based monomer represented by the above general formula (A') and 25 to 2% by weight of maleic anhydride.

In Process I, the styrene-maleic anhydride copolymer obtained by the conventional method as mentioned above is melted as it is or dissolved into an appropriate solvent to make a solution, to which the diamine represented by the general formula (D) is added as it is or in a dissolved state in an appropriate solvent, and then the resulting mixture is reacted.

As the said reaction proceeds without difficulties, the conditions for the reaction are not particularly specified. Usually the aimed styrene-based copolymer of the present invention can be obtained by agitating the mixture sufficiently at a room temperature or kneading with the use of extruder. Herein these are mixed or kneaded preferably in a fluid state (as a solution or in a molten state).

The diamine represented by the general formula (D) forms the structural unit (III) as the result of reacting with maleic anhydride unit. In the general formula (D), $R^3$ is a divalent organic residue, which can contain oxygen, sulfur or nitrogen, for example, an alkylene group having 1 to 12 carbon atoms, an arylene group having 6 to 20 carbon atoms, an ether residue, a sulfone residue and the like. Specific examples of said diamine are o-, m-, p-xylylene diamine; o-, m-, p-phenylene diamine; 4,4'-methylene-o-ethylaniline; 4,4'-methylene-2,6-xylylene diamine; 2,5-dimethyl-p-phenylene diamine; 4,4'-diaminodiphenyl ether; diaminodiphenyl methane; diaminodiphenyl sulfone; 1,2-propyrene diamine; methyliminobispropylene; diethylene triamine and the like.

Examples of the solvents for dissolving the said styrene-maleic anhydride copolymer are methyl ethyl ketone, toluene, xylene, tetrahydrofuran, styrene, methylene chloride, and the like. Examples of solvents for dissolving the diamine represented by the general formula (D) are toluene, xylene, styrene, methyl ethyl ketone, methylene chloride, dimethyl sulfoxide, tetrahydrofuran and the like.

The styrene-maleic anhydride copolymer used here has usually a molecular weight of approximately 50,000 to 500,000.

According to the said Process II, 75 to 98% by weight of styrene-based monomer represented by the general formula (A'), 25 to 2% by weight of maleic anhydride and diamine represented by the general formula (D) are reacted. Styrene-based monomer represented by the general formula (A') forms the structural unit (I) of the copolymer of the present invention. Accordingly, $R^1$ and $R^2$ in the general formula (A') are the same as $R^1$ and $R^2$ in the structural unit (I) described before. More specifically, $R^1$ indicates a hydrogen atom or an alkyl group having 1 to 4 carbon atoms, and $R^2$ is a hydrogen atom or an alkyl group having 1 to 4 carbon atoms.

The specified examples of said styrene-based monomers are styrene, α-methyl styrene, o-methylstyrene, p-methylstyrene, p-isopropylstyrene and the like. As the diamine represented by the general formula (D), diamines specified in Process I can be used. The amount of diamine added can be adjusted so that the molar fraction of the said structural unit (III) in the final copolymer may be 10 to 7000 ppm. Specifically, the amount of diamine added is calculated from the aimed molar fraction in the final copolymer and the molecular weight of diamine.

The conditions for reaction in Process II are not particularly specified. The reaction can be performed by selecting the conditions properly according to the circumstances. As a specific example, the reaction can be performed in accordance with the process described in Japanese Patent Application Laid-Open No. 147413/1985. Diamine can be added to the styrene-based monomer and maleic anhydride before reaction, or can be added at any time in the course of reaction of styrene-based monomer and maleic anhydride, to participate in the reaction.

In addition to enabling an efficient production of styrene-based copolymer of the present invention, said Processes I and II can be applied also for the production of other styrene-based copolymers of the present invention, depending on the condition selected.

The styrene-based copolymer of the present invention, having been improved in its impact resistance while maintaining the heat resistance and the transparency inherent to the copolymer of styrene and maleic anhydride, is a copolymer excellent in all of impact resistance, heat resistance and transparency.

Consequently, the styrene-based copolymer of the present invention can be applied suitably to the material for industrial goods or household electric appliances, more specifically to the material for the retort food containers for its superior properties. According to the process of the present invention, said styrene-based copolymer can be produced efficiently, so the process has a very high value in practical use.

The present invention is described in greater detail by the examples as follows.

EXAMPLE 1

Ten grams of commercially available copolymer of styrene and maleic anhydride (maleic anhydride content: 8 mol%, trade name: Idemitsu MOREMAX UG460, produced by Idemitsu Petrochemical Co., Ltd.) was dissolved into 1 kg of toluene, to which a solution of 0.1 g of m-xylylene diamine dissolved in 100 ml of methylene chloride was added. Thereafter, the solution was poured on a stainless steel sheet, air dried for 24 hours, and then vacuum dried at 180° C.

As the result of infrared absorption analysis, the absorption at 1780 $cm^{-1}$ due to maleic anhydride spread over the range of low wave length, which confirmed that imide bonds were formed.

The final resin was dissolved again into toluene, and then poured into methanol, which resulted in depositing of resin. The supernatant was condensed and poured on KBr plate, dried, and then subjected to IR analysis, to detect no xylylene diamine. This confirmed that all of xylylene diamine had reacted.

EXAMPLE 2

Two kilograms of Idemitsu MOREMAX UG460 was dissolved into 10 liters of toluene, to which a solution of 10 g of m-xylylenediamine dissolved in 100 ml of methylene chloride was added. After agitated for 10 minutes, the mixture was poured on a stainless steel sheet, air dried for 24 hours, and vacuum dried at 180° C.

The resulting resin in plate form was pulverized, and formed into a test piece by injection molding. The heat-distortion temperature and Izod impact strength (without notch) was 104° C and 18.5 kg.cm/$cm^2$, respectively (see Table 1).

A hundred grams of the resin in plate form was dissolved into 1 liter of toluene for 24 hours, centrifuged, and further dipped in 1 liter of toluene, and centrifuged again. As the result of drying and weighing the gel obtained, toluene-insoluble content was 0.1% by weight.

COMPARATIVE EXAMPLE 1

MOREMAX UG460 used as the starting material in the above EXAMPLE 2 was determined for heat-distortion temperature and Izod impact strength (unnotched). The result is shown in Table 1.

EXAMPLE 3 to 5

The same procedure as in EXAMPLE 2 was repeated except that the amounts of m-xylylenediamine used were 2 g, 1 g and 0.2 g, respectively, to obtain a resin. The result is shown in Table 1. In either case, toluene-insoluble content is not more than 0.1% by weight.

EXAMPLE 6

A resin was produced in the same manner as in EXAMPLE 2 except that UG830 (trade name) (copolymer of styrene and maleic anhydride, maleic anhydride content: 15 mol%, produced by Idemitsu Petrochemical Co., Ltd.) was used in place of UG460 and that the amount of m-xylylenediamine used was 2 g. The result is shown in Table 1. The toluene-insoluble content was not more than 0.1% by weight.

COMPARATIVE EXAMPLE 2

A resin was produced in the same manner as in EXAMPLE 2 except that the amount of m-xylylenediamine used was 30 g. The result is shown in Table 1. The molecular weight of the resin was above the limit of measurement by Gel Permeation Chromatography (GPC), and far from measuring. Izod impact strength (unnotched) was not improved, and the test piece was opaque.

COMPARATIVE EXAMPLE 3

MOREMAX UG830 used as the starting material in the above EXAMPLE 6 was measured for heat-distortion temperature and Izod impact strength (unnotched). The result is shown in Table 1.

EXAMPLE 7

A resin was produced in the same manner as in EXAMPLE 2 except that various kinds of diamines shown in Table 2 were used in place of m-xylylenediamine. The result is shown in Table 2. In either case, toluene-insoluble content was not more than 0.1% by weight.

COMPARATIVE EXAMPLE 4

With the pellet of UG460, m-xylylenediamine was mixed so as to make 100 ppm by weight, and kneaded by the use of an extruder having inner diameter of 40 mm (with bent, full-flight screw). The resulting resin contains 1.2% by weight of toluene-insoluble content, and the test piece of injection molding was rough on the surface and opaque. The result is shown in Table 3.

EXAMPLE 8

UG460 was supplied to the extruder in the same manner as in COMPARATIVE EXAMPLE 4, and kneaded, and simultaneously m-xylylenediamine was dropped from the bent. In this occasion, the amount of m-xylylene based on UG460 was 100 ppm by weight, which passed through the extruder again, after that injection molded to make test pieces, and the physical properties of them were determined. The result is shown in Table 3. And the appearance was good. The toluene-insoluble content was 0.1% by weight.

EXAMPLE 9

A resin was produced in the same manner as in EXAMPLE 8, except that 1% toluene solution of diaminodiphenyl methane was used in place of m-xylylenediamine. The toluene-insoluble content was 0.1% by weight. The appearance was good, and Izod weight strength (unnotched) was also high. The result is shown in Table 3.

COMPARATIVE EXAMPLE 5

A resin was produced in the same manner of EXAMPLE 9 except that diaminodiphenylmethane in powder form is used in place of 1% toluene solution of diaminodiphenylmethane.

The test piece formed by injection molding was rough on the surface, opaque, and Izod impact strength (unnotched) was low. The result is shown in Table 3.

PRODUCTION EXAMPLE

Production of a Copolymer of Styrene and Maleic Anhydride

Two 2-liter polymerization tank provided with double helical blades were connected in series, and further a device capable to remove monomers in heated and vacuum state was connected with the second polymerization tank.

In the said apparatus for producing polymer, temperatures of the first polymerization tank and the second polymerization tank were set to 106° C. and 114° C., respectively, a styrene monomer, in which 300 ppm by weight of PERHEXA 3M (peroxide produced by Nihon Yushi Co., Ltd.) was dissolved, was supplied to the first tank at a rate of 700 ml/hr. The content of the first tank was transferred continuously to the second tank while the first tank was kept in fulfilled state, and the content of the second tank was introduced into the device for removing monomer in heated and vacuum state while the second tank was maintained in fulfilled state.

Furthermore, in such conditions, maleic anhydride was supplied to the first and the second tanks at a rate of 10 ml/hr and 7 ml/hr, respectively. The resulting resin contained 7 mol% of maleic anhydride, and Izod impact strength (unnotched) of said resin was 9.8 kg.cm/cm$^2$. The result is shown in Table 4.

EXAMPLE 10

At performing the procedure in the production example described above, m-xylylenediamine was supplied to the first tank at a rate of 0.13 g/hr. The monomer collected with the heat-vacuum device for removing monomers contains no m-xylylenediamine, which confirmed that m-xylylenediamine added was taken into the resin.

The Izod impact strength (unnotched) of the resulting resin was 14.0 kg.cm/cm$^2$, and toluene-insoluble content was 0.09% by weight. The result is shown in Table 4.

EXAMPLE 11

A resin was produced in the same manner as in EXAMPLE 10 except that the m-xylylenediamine was supplied to the second tank instead of the first tank.

Izod impact strength of the resulting resin (unnotched) was 14.8 kg.cm/cm$^2$, and toluene-insoluble content was 0.09% by weight. The result is shown in Table 4.

EXAMPLE 12

The same procedure was repeated as in EXAMPLE 10 except that m-xylylenediamine was supplied with a mixer provided between the second tank and the heat-vacuum device for removing monomers, to obtain a resin.

The Izod impact strength (unnotched) of resin resulted was 14.7 kg.cm/cm$^2$, and toluene-insoluble content was 0.11% by weight. The result is shown in Table 4.

TABLE 1

| | Diamine | | Composition of Copolymer | | | Weight*5 average molecular weight (× 10,000) | Izod*6 impact strength (unnotched) (kg · cm/cm$^2$) | Heat-*7 distortion temperature (°C.) |
|---|---|---|---|---|---|---|---|---|
| No. | Kind | Amount*1 Added (wt ppm) | Structural*2 Unit (I) (mol %) | Structural*3 Unit (II) (mol %) | Structural*4 Unit (III) (mol ppm) | | | |
| Example 2 | m-xylylenediamine | 5000 | 92.00 | 7.62 | 3800 | 120 | 18.5 | 104 |
| Example 3 | m-xylylenediamine | 1000 | 92.00 | 7.92 | 760 | 92.1 | 17.3 | 103 |
| Example 4 | m-xylylenediamine | 500 | 92.00 | 7.96 | 380 | 40.2 | 15.4 | 103 |
| Example 5 | m-xylylenediamine | 100 | 92.00 | 7.99 | 76 | 32.2 | 13.2 | 104 |
| Comparative Example 1 | — | — | 92.00 | 8.00 | — | 28.1 | 9.6 | 103 |
| Comparative Example 2 | m-xylylenediamine | 15000 | 92.00 | 6.86 | 14400 | Unmeasurable | 10.1 | 103 |
| Example 6 | m-xylylenediamine | 500 | 85.00 | 14.96 | 380 | 28.1 | 12.9 | 115 |
| Comparative Example 3 | — | — | 85.00 | 15.00 | — | 20.8 | 7.0 | 115 |

*1 Proportion by weight to the amount of MOREMAX
*2 Styrene unit
*3 Maleic anhydride unit
*4 Unit produced by reacting one molecule of xylylenediamine with two molecules of maleic anhydride
*5 Measured by Gel Permeation Chromatography Values calculated as polystyrene
*6 Measured according to DIN 1533
*7 Measured according to JIS 6871

TABLE 2

| Diamine | | Composition of Copolymer | | | Weight*5 average molecular weight (10,000) | Izod*6 impact strength (unnotched) (kg · cm/cm$^2$) | Heat-*7 distortion temperature (°C.) |
|---|---|---|---|---|---|---|---|
| Kind | Amount*1 Added (wt ppm) | Structural*2 Unit (I) (mol %) | Structural*3 Unit (II) (mol %) | Structural*4 Unit (III) (mol ppm) | | | |
| p-xylylenediamine | 500 | 92.0 | 7.96 | 380 | 39.1 | 16.0 | 103 |
| p-phenylenediamine | 500 | 92.0 | 7.95 | 480 | 46.1 | 16.5 | 104 |
| m-phenylenediamine | 500 | 92.0 | 7.95 | 480 | 46.4 | 16.3 | 104 |
| 4,4'-methylene-o-ethylaniline | 500 | 92.0 | 7.98 | 205 | 37.2 | 14.0 | 103 |
| 4,4'-methylene-2,6-xylidine | 500 | 92.0 | 7.98 | 205 | 35.3 | 14.3 | 103 |

TABLE 2-continued

| Diamine | | Composition of Copolymer | | | Weight[*5] average molecular weight (10,000) | Izod[*6] impact strength (unnotched) (kg · cm/cm²) | Heat-[*7] distortion temperature (°C.) |
|---|---|---|---|---|---|---|---|
| Kind | Amount[*1] Added (wt ppm) | Structural[*2] Unit (I) (mol %) | Structural[*3] Unit (II) (mol %) | Structural[*4] Unit (III) (mol ppm) | | | |
| 2,5-diethyl-p-phenylenediamine | 500 | 92.0 | 7.96 | 380 | 40.8 | 15.3 | 104 |
| 4,4'-diaminodiphenylether | 500 | 92.0 | 7.96 | 400 | 44.4 | 16.0 | 103 |
| diaminodiphenylmethane | 500 | 92.0 | 7.97 | 260 | 35.5 | 15.9 | 104 |
| diaminodiphenylsulfone | 500 | 92.0 | 7.97 | 280 | 37.4 | 14.0 | 104 |
| 1,2-propyrenediamine | 100 | 92.0 | 7.98 | 140 | 33.4 | 13.4 | 103 |
| methyliminobispropylamine | 100 | 92.0 | 7.98 | 70 | 31.9 | 13.0 | 103 |
| diethylenetriamine | 100 | 92.0 | 7.98 | 100 | 32.5 | 13.4 | 103 |

*1 to *7: Same as in Table 1.

TABLE 3

| No. | Diamine | | Composition of Copolymer | | | Izod[*6] impact strength (unnotched) (kg · cm/cm²) | Heat-[*7] distortion temperature (°C.) | Transparency |
|---|---|---|---|---|---|---|---|---|
| | Kind | Amount[*1] Added (wt ppm) | Structural[*2] Unit (I) (mol %) | Structural[*3] Unit (II) (mol %) | Structural[*4] Unit (III) (mol ppm) | | | |
| Example 8 | m-xylylenediamine | 100 | 92.00 | 7.99 | 76 | 13.1 | 104 | Transparent |
| Example 9 | Diaminodiphenylmethane | 250 | 92.00 | 7.98 | 130 | 13.6 | 103 | Transparent |
| Comparative Example 4 | m-xylylenediamine | 100 | 92.00 | 7.99 | 76 | 9.3 | 103 | Opaque |
| Comparative Example 5 | Diaminodiphenylmethane | 250 | 92.00 | 7.98 | 130 | 9.0 | 104 | Opaque |

*1 to 4, 6, 7: Same as in Table 1.

TABLE 4

| No. | Diamine | | Composition of Copolymer | | | Weight[*5] average molecular weight (10,000) | Izod[*6] impact strength (unnotched) (kg · cm/cm²) | Heat-[*7] distortion temperature (°C.) |
|---|---|---|---|---|---|---|---|---|
| | Kind | Amount[*1] Added (wt ppm) | Structural[*2] Unit (I) (mol %) | Structural[*3] Unit (II) (mol %) | Structural[*4] Unit (III) (mol ppm) | | | |
| Example 10 | m-xylylenediamine | 100 | 92.00 | 6.99 | 76 | 32.9 | 14.0 | 104 |
| Example 11 | m-xylylenediamine | 100 | 92.00 | 6.99 | 76 | 33.2 | 14.8 | 104 |
| Example 12 | m-xylylenediamine | 100 | 92.00 | 6.99 | 76 | 32.4 | 14.7 | 104 |
| Production Example | — | — | 92.00 | 7.00 | — | 27.8 | 9.8 | 103 |

*1 to 7: Same as in Table 1.

What is claimed is:

1. A styrene-based copolymer comprising 74.3 to 98.7 mol% of the structural unit (I) represented by the general formula:

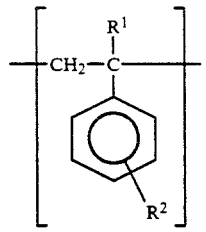

wherein $R^1$ is a hydrogen atom or an alkyl group having 1 to 4 carbon atoms, and $R^2$ is a hydrogen atom or an alkyl group having 1 to 4 carbon atoms, 1.3 to 25.4 mol% of the structural unit (II) represented by the formula:

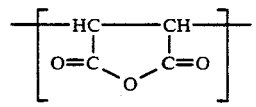

and 10 to 7000 mol ppm of the structural unit (III) represented by the general formula:

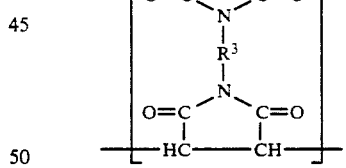

wherein $R^3$ is an alkylene group having 1 to 12 carbon atoms, an arylene group having 6 to 20 carbon atoms, an ether residue or a sulfone residue, characterized by having toluene-insoluble content of not more than 0.5% by weight.

2. The styrene-based copolymer of claim 1, comprising 79.1 to 96.7 mol% of the structural unit (I), 3.3 to 20.4 mol% of the structural unit (II) and 30 to 5000 mol ppm of the structural unit (III).

3. The styrene-based copolymer of claim 1 or 2, having toluene-insoluble content of not more than 0.1% by weight.

4. The styrene-based copolymer of claim 1, wherein $R^1$ and $R^2$ are each hydrogen atom.

5. The styrene-based copolymer of claim 1 or 2, having a weight average molecular weight of 100,000 to 3,000,000.

* * * * *